(12) United States Patent
Inbe et al.

(10) Patent No.: US 8,784,629 B2
(45) Date of Patent: Jul. 22, 2014

(54) METHOD OF PRODUCING SURFACE-TREATED METAL MATERIAL AND METHOD OF PRODUCING COATED METAL ITEM

(75) Inventors: Toshio Inbe, Tokyo (JP); Hiroshi Kameda, Tokyo (JP); Thomas Kolberg, Heppenheim (DE)

(73) Assignee: Chemetall GmbH, Frankfurt am Main (DE)

( * ) Notice: Subject to any disclaimer, the term of this patent is extended or adjusted under 35 U.S.C. 154(b) by 466 days.

(21) Appl. No.: 12/679,048

(22) PCT Filed: Sep. 26, 2008

(86) PCT No.: PCT/JP2008/067487
§ 371 (c)(1),
(2), (4) Date: May 19, 2010

(87) PCT Pub. No.: WO2009/041616
PCT Pub. Date: Apr. 2, 2009

(65) Prior Publication Data
US 2010/0243465 A1    Sep. 30, 2010

(30) Foreign Application Priority Data

Sep. 27, 2007   (JP) ................................ P2007-251509

(51) Int. Cl.
*C25D 13/04*   (2006.01)
*C23C 10/02*   (2006.01)
*C23C 22/80*   (2006.01)

(52) U.S. Cl.
USPC ............ 204/486; 148/247; 148/274; 148/279

(58) Field of Classification Search
USPC .......................... 204/486; 148/247, 274, 279
See application file for complete search history.

(56) References Cited

U.S. PATENT DOCUMENTS

| 5,618,402 | A  | * | 4/1997  | Sakurai et al. ............... 205/244 |
| 5,743,971 | A  | * | 4/1998  | Inoue et al. .................... 148/247 |
| 6,770,185 | B2 | * | 8/2004  | Jordan et al. .................. 205/244 |
| 7,402,214 | B2 |   | 7/2008  | Greene et al. |
| 7,776,448 | B2 |   | 8/2010  | Greene et al. |
| 7,811,366 | B2 |   | 10/2010 | Inbe et al. |
| 8,101,014 | B2 |   | 1/2012  | Kolberg et al. |
| 8,182,874 | B2 |   | 5/2012  | Kolberg et al. |
| 8,221,559 | B2 |   | 7/2012  | Inbe et al. |
| 8,262,809 | B2 |   | 9/2012  | Inbe et al. |
| 8,287,662 | B2 |   | 10/2012 | Inbe et al. |
| 2004/0163735 | A1 |   | 8/2004  | Matsukawa et al. |
| 2004/0244874 | A1 |   | 12/2004 | Nakayama et al. |
| 2004/0244875 | A1 | * | 12/2004 | Yasuda et al. ................ 148/247 |
| 2008/0138615 | A1 |   | 6/2008  | Kolberg et al. |
| 2008/0230394 | A1 |   | 9/2008  | Inbe et al. |
| 2008/0302448 | A1 |   | 12/2008 | Frey et al. |
| 2010/0170594 | A1 |   | 7/2010  | Inbe et al. |
| 2010/0176000 | A1 |   | 7/2010  | Inbe et al. |

FOREIGN PATENT DOCUMENTS

| EP | 1 405 933    | A1 |   | 4/2004 |
| JP | 4-048095     |    |   | 2/1992 |
| JP | 2004-218070  |    | * | 8/2004 |
| JP | 2004-218075  |    |   | 8/2004 |
| JP | 2007-217728  |    |   | 8/2007 |
| WO | 02/103080    |    |   | 12/2002 |
| WO | 03/093532    | A2 |   | 11/2003 |
| WO | 2007/065645  | A1 |   | 6/2007 |

OTHER PUBLICATIONS

English language translation of International Preliminary Report on Patentability that issued with respect to PCT/JP2008/067487, mailed on May 14, 2010.
International Search Report that issued with respect to PCT/JP2008/067487, mailed Nov. 4, 2008.
International Preliminary Report on Patentability that issued with respect to PCT/JP2008/067487 on Mar. 30, 2010.

* cited by examiner

*Primary Examiner* — Kishor Mayekar
(74) *Attorney, Agent, or Firm* — Greenblum & Bernstein, P.L.C.

(57) ABSTRACT

A method of producing a surface-treated metal material, comprising: surface treating a metal material using a treatment liquid (1), which comprises from 10 to 10,000 ppm of tin ions and has a pH of 1.0 or greater, and subjecting the metal material that has undergone surface treatment with the treatment liquid (1) to an additional chemical conversion treatment using a treatment liquid (2), which comprises zirconium ions and/or titanium ions.

12 Claims, 1 Drawing Sheet

METHOD OF PRODUCING SURFACE-TREATED METAL MATERIAL AND METHOD OF PRODUCING COATED METAL ITEM

TECHNICAL FIELD

The present invention relates to a method of producing a surface-treated metal material, and a method of producing a coated metal item that includes performing cationic electrodeposition coating on the produced surface-treated metal material.

BACKGROUND ART

Surface treatments are used conventionally for imparting corrosion resistance to a variety of metal substrates. In particular, zinc phosphate treatments are widely used on the metal substrates used for constructing automobiles. However, this zinc phosphate treatment has a problem in that a sludge is generated as a by-product. As a result, next-generation surface treatments that do not use zinc phosphate are now being sought, and one example is a surface treatment that uses zirconium ions (see Japanese Patent Laid-Open No. 2004-218070).

Metal substrates used for constructing automobiles, which require a high degree of corrosion resistance, are subjected to cationic electrodeposition coating following surface treatment. The reasons for performing this cationic electrodeposition coating include not only the fact that the coating film obtained by cationic electrodeposition coating exhibits superior corrosion resistance, but also the fact that cationic electrodeposition coating enables coating to be performed right into the corners of automobile bodies having a complex shape, so-called "throwing power".

However, recently it has become apparent that in some cases where cationic electrodeposition coating is performed on a metal substrate that has already undergone an aforementioned surface treatment with zirconium ions, a satisfactory throwing power effect may be unattainable. For example, the throwing power is sometimes unsatisfactory when coating cold-rolled steel sheet. If, in this manner, the throwing power is unsatisfactory during the cationic electrodeposition coating, then an adequate level of corrosion resistance cannot be achieved.

DISCLOSURE OF INVENTION

The present invention has an object of providing a surface treatment that exhibits excellent corrosion resistance, and is capable of generating favorable throwing power when cationic electrodeposition coating is performed on a metal substrate that has been surface treated without using zinc phosphate.

One aspect of the present invention provides a method of producing a surface-treated metal material, comprising: surface treating a metal material using a treatment liquid (1), which comprises from 10 to 10,000 ppm of tin ions and has a pH of 1.0 or greater, and subjecting the metal material that has undergone surface treatment with the treatment liquid (1) to an additional chemical conversion treatment using a treatment liquid (2), which comprises zirconium ions and/or titanium ions.

Another aspect of the present invention provides a method of producing a coated metal item, comprising: surface treating a metal material using a treatment liquid (1), which comprises from 10 to 10,000 ppm of tin ions and has a pH of 1.0 or greater, subjecting the metal material that has undergone surface treatment with the treatment liquid (1) to an additional chemical conversion treatment using a treatment liquid (2), which comprises zirconium ions and/or titanium ions, and forming a coating film by cationic electrodeposition coating.

BEST MODE FOR CARRYING OUT THE INVENTION

A method of producing a surface-treated metal material according to the present invention comprises: surface treating a metal material using a treatment liquid (1), which comprises from 10 to 10,000 ppm of tin ions and has a pH of 1.0 or greater, and subjecting the metal material that has undergone surface treatment with the treatment liquid (1) to an additional chemical conversion treatment using a treatment liquid (2), which comprises zirconium ions and/or titanium ions.

In the present invention, the treatment using the treatment liquid (1) comprising tin ions is conducted prior to the treatment using the treatment liquid (2) comprising zirconium ions and/or titanium ions. By conducting a surface treatment using the treatment liquid (1) and a chemical conversion treatment using the treatment liquid (2) in this manner, the metal material surface is covered with a uniform surface treatment film, without leaving any exposed sections on the metal material surface. It is thought that, as a result, the current flow during cationic electrodeposition coating is more uniform, electrodeposition occurs uniformly, and satisfactory throwing power can be achieved.

According to this production method of the present invention, by conducting a surface treatment with the treatment liquid (1), a layer (1) formed from the treatment liquid (1) is first formed on the surface of the metal material. Subsequently, a layer (2) formed from the treatment liquid (2) is formed on the metal material having the layer (1) formed thereon.

When a metal substrate is subjected to a chemical conversion treatment with a surface treatment agent that uses zirconium ions and/or titanium ions, as in the treatment liquid (2), a chemical conversion film is formed from an oxide of the zirconium and/or titanium, and it is thought that the formation of this chemical conversion film occurs at the same time that the metal substrate is etched under an acidic atmosphere.

However, in those cases where the metal material is an iron-based substrate, and particularly a cold-rolled steel sheet or the like, segregated deposits of silica, silicon or carbon or the like may exist on the substrate surface, and etching tends to proceed poorly within such regions. Accordingly, if treatment with the treatment liquid (2) is performed without any pretreatment, then uniform formation of a chemical conversion film by deposition of an oxide of the zirconium and/or titanium tends to be problematic, and even following completion of the chemical conversion treatment, regions may exist where the chemical conversion film has not been formed, thereby partially exposing the metal material. As a result, the nature of the current flow differs between those regions where the chemical conversion film has been formed and those regions where the film has not been formed, meaning the electrodeposition coating loses uniformity, and the desired throwing power can not be satisfactorily achieved. Here, the "throwing power" describes the property of being able to sequentially form an insulating coating film on those regions of the metal material representing the coating target on which a coating film has not yet been deposited.

In contrast, by first performing a treatment using the treatment liquid (1) comprising tin ions, and forming a layer (1) from that treatment in advance, the problem of a portion of the metal material remaining untreated and exposed following treatment with the treatment liquid (2) can be prevented. It is thought that the reason for this observation is that because tin ions are less affected by segregated deposits on the substrate surface than zirconium ions and titanium ions, the surface of the metal material can be uniformly coated with the layer (1) generated from the treatment liquid (1). As a result, a layer (2) generated from the treatment liquid (2) and comprising an oxide of zirconium and/or titanium can be formed uniformly on the metal material having the layer (1) already formed uniformly thereon.

According to the present invention, in which surface treatment using the treatment liquid (1) is conducted prior to chemical conversion treatment using the treatment liquid (2), an electrodeposition coating film can be formed with favorable throwing power, meaning the method of the present invention is suitable as a chemical conversion treatment method for metal materials having a complex shape. In terms of the treatment target metal, a feature of the present invention is the fact that the method of the present invention is also suitable for iron-based substrates such as iron sheets, for which the formation of a uniform chemical conversion film of excellent adhesion and corrosion resistance has conventionally proven difficult.

From the viewpoint of achieving a satisfactory manifestation of the targeted effect, the tin ions contained within the treatment liquid (1) are preferably divalent cations.

Examples of compounds for supplying the tin ions include tin sulfate, tin acetate, tin fluoride, tin chloride and tin nitrate. These compounds may be used either alone, or in combinations containing two or more different compounds.

The concentration of the tin ions within the treatment liquid (1) is typically within a range from 10 to 10,000 ppm, is preferably from 20 to 2,000 ppm, and is even more preferably from 30 to 500 ppm. If this tin ion concentration is less than 10 ppm, then there is a feat that the targeted effect might be unobtainable, whereas if the concentration exceeds 10,000 ppm, there is a fear that deposition of the zirconium and/or titanium that represents the chemical conversion film component within the treatment liquid (2) might become difficult.

Moreover, for the same reasons as those described above, the tin ion concentration within the treatment liquid (1) relative to the concentration of the zirconium and/or titanium ions within the treatment liquid (2) described below (namely, the ratio of the concentration of tin ions relative to the concentration of zirconium ions and/or titanium ions) is preferably within a range from 0.005 to 1, and is even more preferably from 0.02 to 0.2.

In this specification, the concentration of metal ions is reported as a calculated metal element concentration, which in those cases where a complex or oxide is formed, focuses only on the metal atoms within the complex or oxide. For example, the calculated metal element concentration of zirconium (molecular weight: 91) for 100 ppm of the complex ion $ZrF_6^{2-}$ (molecular weight: 205) is calculated to be 44 ppm using the formula $100\times(91/205)$. In the treatment liquid (1) and the treatment liquid (2), even if it is assumed that a portion of the metal compounds (such as tin compounds, zirconium compounds or titanium compounds) exist in a non-ionic state such as in the form of an oxide, it is thought that the proportion of such non-ionic moieties is very small, and that almost all of the compounds exist as metal ions. Accordingly, the metal ion concentrations reported in this specification assume that the compound undergoes 100% dissociation and exists entirely as metal ions, regardless of whether or not a portion of the compound exists in a non-ionic form.

Furthermore, unless stated otherwise, concentration values reported in this specification are calculated by mass.

The treatment liquid (1) preferably also comprises a surfactant. Including a surfactant is preferred, as it enables a favorable chemical conversion film to be formed even if the metal material is not cleaned in advance by conducting a degreasing treatment. Conventional surfactants may be used, including nonionic surfactants, anionic surfactants, cationic surfactants and amphoteric surfactants, and a combination of a plurality of surfactants may also be used.

The concentration of the surfactant within the treatment liquid (1) is preferably within a range from 100 to 10,000 ppm, and is even more preferably from 500 to 5,000 ppm.

In order to further enhance the corrosion resistance of the chemical conversion film, the treatment liquid (1) preferably also comprises a rustproofing agent. The use of a nitrogen-, sulfur- and/or phenol-based rustproofing agent is preferred. These rustproofing agents form a corrosion resistant film on the metal surface, and are therefore able to inhibit corrosion. One or more materials selected from the group consisting of hydroquinone, ethylene urea, quinolinol, thiourea, benzotriazole, and salts thereof can be used as the nitrogen-, sulfur- and/or phenol-based rustproofing agent.

The quantity of the rustproofing agent, if used, is preferably within a range from 0.1 to 10,000 ppm, and is even more preferably from 1 to 1,000 ppm. If this quantity is less than 0.1 ppm, then achieving the desired effect might be difficult, whereas if the quantity exceeds 10,000 ppm, then the deposition of zirconium and/or titanium may be inhibited in some cases.

The treatment liquid (2) comprises zirconium ions and/or titanium ions, and can conduct a chemical conversion treatment to a surface of metal material.

Examples of compounds for supplying the zirconium ions include fluorozirconic acid, salts of fluorozirconic acid such as potassium fluorozirconate and ammonium fluorozirconate, zirconium fluoride, zirconium oxide, zirconium oxide colloid, zirconyl nitrate and zirconium carbonate. These compounds may be used either alone, or in combinations containing a plurality of different compounds.

Examples of compounds for supplying the titanium ions include fluorotitanates such as alkali metal fluorotitanates and $(NH_4)_2TiF_6$, soluble fluorotitanates including fluorotitanic acids such as $H_2TiF_6$, as well as titanium fluoride and titanium oxide. These compounds may be used either alone, or in combinations containing a plurality of different compounds.

The concentration of the zirconium ions and/or titanium ions within the treatment liquid (2) is typically within a range from 10 to 10,000 ppm, is preferably from 50 to 2,000 ppm, and is even more preferably from 100 to 500 ppm. If the concentration of these ions is less than 10 ppm, then satisfactory corrosion resistance may be unobtainable in some cases, whereas even if the concentration exceeds 10,000 ppm, a corresponding improvement in effect would be unlikely.

The treatment liquid (2) may comprise an organosilane. Namely, one embodiment of producing a surface-treated metal material according to the present invention comprises: surface treating a metal material using a treatment liquid (1), which comprises from 10 to 10,000 ppm of tin ions and has a pH of 1.0 or greater, and subjecting the metal material that has undergone surface treatment with the treatment liquid (1) to an additional chemical conversion treatment using a treatment liquid (2), which comprises zirconium ions and/or titanium ions, and an organosilane.

The organosilane within the treatment liquid (2) is an organosilicon compound, and although there are no particular restrictions, examples of preferred compounds include vinyltrichlorosilane, vinyltrimethoxysilane, vinyltriethoxysilane, 2-(3,4-epoxycyclohexyl)-ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)-propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane. These compounds may be used either alone, or in combinations containing a plurality of different compounds.

Commercially available silane coupling agents such as KBM-403, KBM-602, KBM-603, KBE-603, KBM-903, KBE-903, KBE-9103, KBM-573 and KBP-90 (all product names, manufactured by Shin-Etsu Chemical Co., Ltd.) and XS1003 (a product name, manufactured by Chisso Corporation) can also be used.

In the treatment liquid (2), at least a portion of the organosilane preferably exists as a condensed organosiloxane generated by hydrolysis of the organosilane. Furthermore, in such a case, a higher condensation degree is preferred, as it ensures that during deposition of the zirconium and/or titanium as an oxide, the organosilane is more readily incorporated within the oxide. A polyorganosiloxane produced by the polycondensation of three or more organosilanes is particularly preferred. The polycondensation rate of the organosiloxane can be measured using $^{29}$Si-NMR.

The organosilane is preferably first subjected to a partial polycondensation to form an organosiloxane, and then used in the preparation of the treatment liquid (2).

In order to enhance the adhesion between the cationic electrodeposition coating film and chemical conversion coating formed after the chemical conversion treatment, the treatment liquid (2) preferably includes a polyamine compound. Examples of this polyamine compound include hydrolysis-condensation products (amino group-containing organosilanes) of amino group-containing silanes (aminosilanes) among the organosilanes above, polyvinylamines and polyallylamines. In terms of being able to freely control the amine quantity, a hydrolysis-condensation product (namely, an organosiloxane) of an amino group-containing silane having a hydrolyzable group is preferred.

The hydrolysis-condensation of the amino group-containing silane can be conducted using a method well known to those skilled in the art. Specifically, the hydrolysis-condensation may be conducted by adding water to at least one variety of amino group-containing silane, in sufficient quantity to hydrolyze the hydrolyzable group such as an alkoxysilyl group, and then stirring under heat if required. By adjusting the quantity of water used, the condensation degree can be controlled.

A higher condensation degree for the obtained amino group-containing organosiloxane is preferred, as it ensures that, during deposition of the zirconium and/or titanium as an oxide, the organosiloxane is more readily incorporated within the oxide, and also improves the adhesion with the cationic electrodeposition coating film. Accordingly, when the amino group-containing silane is reacted via the hydrolysis-condensation reaction, the reaction is preferably conducted under conditions that facilitate the hydrolysis and condensation of the amino group-containing silane, for example by using, as the solvent, an aqueous solvent comprising a catalyst such as an alcohol or acetic acid. Furthermore, by conducting the reaction under conditions including a comparatively high concentration of the amino group-containing silane, a hydrolysis-condensation product having a high condensation degree is obtained. Specifically, performing the hydrolysis-condensation with the concentration of the amino group-containing silane within a range from 5 to 50% by mass is preferred.

The condensation degree can be determined using $^{29}$Si-NMR.

Commercially available products may be used as the above polyvinylamines and polyallylamines, which may be a homopolymer or a copolymer. An example of a polyvinylamine is PVAM-0595B (a product name, manufactured by Mitsubishi Chemical Corporation), whereas examples of polyallylamines include PAA-01, PAA-10C, PAA-H-10C and PAA-D-41HCl (all product names, manufactured by Nitto Boseki Co., Ltd.).

From the viewpoints of ensuring favorable adhesion and film formability for the resulting chemical conversion film, the molecular weight of the polyamine compound such as the organosiloxane produced by a polycondensation of the aforementioned amino group-containing silane is preferably within a range from 150 to 500,000, and is even more preferably from 5,000 to 70,000.

Moreover, in the polyamine compound, if the quantity of amino groups is too large, then bonding and the like between amino groups may cause a deterioration in the adhesion with the cationic electrodeposition coating film, or have an adverse effect on the film properties, whereas if the quantity of amino groups is too small, then the effect of the amino groups in improving the adhesion to the coating film becomes difficult to achieve. Consequently, each 1 g of the polyamine solid fraction preferably includes at least 0.1 mmol but not more than 17 mmol of primary and/or secondary amino groups, and each 1 g of the solid fraction even more preferably includes at least 3 mmol but not more than 15 mmol of primary and/or secondary amino groups.

The number of mols of primary and/or secondary amino groups per 1 g of the polyamine compound solid fraction can be calculated from Formula (1) shown below.

$$\text{Amino group quantity}=(mX-nY)/(m+n) \quad \text{Mathematical Formula (1)}$$

In Mathematical Formula (1), if the solid fraction mass ratio between the polyamine compound and a compound having a functional group (A) and/or a functional group (B) is represented by m:n, then the number of mmols of the functional group (A) and/or the functional group (B) per 1 g of the compound having the functional group (A) and/or the functional group (B) is termed Y, and the number of mmols of primary and/or secondary amino groups contained within 1 g of the polyamine compound in those cases where the compound having the functional group (A) and/or the functional group (B) is not included within the treatment liquid (2) is termed X.

The quantity of the organosilane within the treatment liquid (2) may be set within a range from 1 to 200% relative to the calculated metal mass of zirconium and/or titanium incorporated within the treatment liquid (2), in view of the targeted effect and a satisfactory formation of the film.

The treatment liquid (2) preferably also comprises tin ions. This enables further improvements in the adhesion, corrosion resistance and rustproof properties of the coating film.

Examples of compounds for supplying the tin ions include the same compounds as those used in the treatment liquid (1) described above. The concentration of tin ions within the treatment liquid (2) is preferably within a range from 1 to 1,000 ppm, and is even more preferably from 5 to 200 ppm.

The ratio of the concentration of tin ions within the treatment liquid (2) relative to the combined concentration of the aforementioned zirconium ions and titanium ions is preferably within a range from 0.005 to 1, and is even more preferably from 0.02 to 0.2. Moreover, in order to achieve the effects of the present invention adequately, the combined quantity of zirconium ions, titanium ions and tin ions within the treatment liquid (2) is preferably at least 15 ppm.

In those cases where the treatment liquid (2) includes a large quantity of a metal other than zirconium and/or titanium, including a chelate compound enables a film of a zirconium oxide and/or a titanium oxide to be formed in a stable manner. It is thought that the reason for this observation is that the chelate compound traps those metal ions that precipitate more readily than the zirconium and/or titanium.

Examples of preferred chelate compounds include amino acids, aminocarboxylic acids, phenol compounds, aromatic carboxylic acids, sulfonic acids and ascorbic acid, and these compounds may be used either alone, or in combinations containing two or more different compounds. Carboxylic acids having a hydroxyl group such as citric acid and gluconic acid, which are well known as chelating agents, are unable to function satisfactorily in the present invention.

Amino acids that can be used include not only the various natural amino acids and synthetic amino acids, but also a wide range of amino acids having at least one amino group and at least one acid group (such as a carboxyl group or sulfonic acid group) within each molecule. Of these, at least one compound selected from the group consisting of alanine, glycine, glutamic acid, aspartic acid, histidine, phenylalanine, asparagine, arginine, glutamine, cysteine, leucine, lysine, proline, serine, tryptophan, valine, tyrosine, and the salts thereof can be used favorably. Furthermore, in those cases where optical isomers exist for an amino acid, the L-isomer, D-isomer or a racemic mixture may all be used favorably.

Aminocarboxylic acids that can be used, besides the amino acids described above, include a wide range of compounds having both amino group and carboxyl group functional groups within each molecule. Of these, at least one compound selected from the group consisting of diethylenetriaminepentaacetic acid (DTPA), hydroxyethylethylenediaminetriacetic acid (HEDTA), triethylenetetraminehexaacetic acid (TTHA), 1,3-propanediaminetetraacetic acid (PDTA), 1,3-diamino-6-hydroxypropanetetraacetic acid (DPTA-OH), hydroxyethyliminodiacetic acid (HIDA), dihydroxyethylglycine (DHEG), glycoletherdiaminetetraacetic acid (GEDTA), dicarboxymethylglutamic acid (CMGA), (S,S)-ethylenediaminedisuccinic acid (EDDS), ethylenediaminetetraacetic acid (EDTA), nitrilotriacetic acid (NTA), and salts thereof can be used favorably.

Examples of the phenol compounds include compounds having two or more phenolic hydroxyl groups, and phenol-based compounds having a basic skeleton based on such a compound having two or more phenolic hydroxyl groups. Examples of the former include catechol, gallic acid, pyrogallol and tannic acid. Examples of the latter include polyphenol-based compounds including flavanoids, tannins and catechins, such as flavone, isoflavone, flavonol, flavanone, flavanol, anthocyanidin, aurone, chalcone, epigallocatechin gallate, gallocatechin, theaflavin, daidzin, genistin, rutin and myricitrin; polyvinylphenols and water-soluble resols, novolak resins, and lignin. Of these, tannins, gallic acid, catechins and pyrogallol are particularly desirable.

Examples of sulfonic acids that can be used favorably include at least one compound selected from the group consisting of methanesulfonic acid, isethionic acid, taurine, naphthalenedisulfonic acid, aminonaphthalenedisulfonic acid, sulfosalicylic acid, naphthalenesulfonic acid-formaldehyde condensates, alkylnaphthalenesulfonic acids, and salts thereof.

If a sulfonic acid is used, then the coatability and corrosion resistance of the treated item following the chemical conversion treatment are improved. Although the mechanism for this improvement is not entirely clear, the following two reasons appear plausible. Firstly, because the surface of the item undergoing treatment such as a steel sheet includes silica segregated deposits and the like, meaning the surface composition is not uniform, some portions of the surface may be more difficult to etch during the chemical conversion treatment, but it is thought that by adding a sulfonic acid, particularly these portions that are difficult to etch can be etched, and as a result, a uniform metal oxide film can be formed more readily on the surface of the item undergoing treatment. In other words, it is thought that the sulfonic acid functions as an etching accelerator. Secondly, there is a possibility that the hydrogen gas generated by the chemical conversion reaction during the chemical conversion treatment may hinder the interface reaction, but it is thought that the sulfonic acid removes the hydrogen gas via a depolarization action, thereby promoting the reaction.

Of the sulfonic acids, taurine is preferred in terms of including both an amino group and a sulfonic acid group.

The quantity of the sulfonic acid is preferably within a range from 0.1 to 10,000 ppm, and is even more preferably from 1 to 1,000 ppm. If this quantity is less than 0.1 pm, then achieving the desired effects might be difficult, whereas if the quantity exceeds 10,000 ppm, then deposition of the zirconium and/or titanium might be inhibited in some cases.

If ascorbic acid is used as the chelating agent, then a uniform metal oxide film such as zirconium oxide and/or titanium oxide or tin oxide is formed more readily by the chemical conversion treatment on the surface of the item undergoing treatment, and the coatability and corrosion resistance can also be further improved. Although the mechanism for this improvement is not entirely clear, it is thought that the etching action in the chemical conversion treatment occurs uniformly across the item undergoing treatment such as a steel sheet, and as a result, the zirconium oxide and/or titanium oxide, and the tin oxide are deposited on the etched portions, enabling formation of a uniform metal oxide film. Furthermore, because tin tends to be readily deposited as metallic tin at the metal interface for some reason, it is thought that zirconium oxide and/or titanium oxide are then deposited in the regions containing the deposited metallic tin, which causes an overall increase in the surface coverage of the item undergoing treatment.

The quantity of ascorbic acid within the treatment liquid (2) is preferably within a range from 5 to 5,000 ppm, and is even more preferably from 20 to 200 ppm. If this quantity is less than 5 ppm, then achieving the desired effect might become difficult, whereas if the quantity exceeds 5,000 ppm, the deposition of the zirconium and/or titanium might be inhibited in some cases.

In those cases where the treatment liquid (2) includes the above type of chelating agent, the quantity of that chelating agent is preferably equivalent to a concentration that is 0.5 to 10 times the combined concentration of the cations other than zirconium and titanium. If this value is less than 0.5 times, then the targeted effect might be unobtainable, whereas a value that exceeds 10 times might have an adverse effect on the film formability.

In a preferred embodiment, the treatment liquid (2) may further comprise aluminum ions and/or indium ions. These cations have a similar function to the tin ions described above. The quantity of the aluminum ions and/or indium ions is preferably equivalent to a concentration that is from 2 to 1,000% relative to the concentration of zirconium ions and/or titanium ions.

Examples of compounds that can be used favorably for supplying the aluminum ions include aluminum nitrate and aluminum fluoride. Examples of compounds that can be used favorably for supplying the indium ions include indium nitrate and indium chloride. These compounds may be used either alone, or in combinations containing a plurality of different compounds.

In a preferred embodiment, at least one of the treatment liquid (1) and the treatment liquid (2) may include copper ions. By including copper ions within at least one of the treatment liquids, the corrosion resistance of the chemical conversion film can be improved even further. Although the reason for this improvement is not entirely clear, it is thought that some form of interaction occurs between the copper and the zirconium and/or titanium during formation of the film.

The quantity of copper ions, in the case of inclusion within the treatment liquid (1) or the case of inclusion within a treatment liquid (2) containing tin ions is preferably equivalent to a concentration that is from 10 to 100% relative to the concentration of tin ions. If this concentration is less than 10%, then the targeted effects might be unobtainable, whereas if the concentration exceeds the concentration of tin ions, then in a similar manner to that described for the tin ions, deposition of the zirconium and/or titanium might become difficult. For similar reasons to those described above, the concentration of copper ions included within a treatment liquid (2) containing no tin ions is preferably within a range from 0.1 to 1,000 ppm, and is even more preferably from 1 to 200 ppm.

Examples of compounds that can be used favorably for supplying the copper ions include copper acetate, copper nitrate, copper sulfate and copper chloride, and combinations of a plurality of these compounds may also be used.

At least one of the treatment liquid (1) and the treatment liquid (2) may also include any of a variety of other cations besides the components described above. Examples of these other cations include magnesium, zinc, calcium, gallium, iron, manganese, nickel, cobalt and silver. In addition to these cations, other cations or anions may also exist within the treatment liquids, either as ions derived from bases or acids added in order to regulate the pH, or as counter ions for the components described above.

At least one of the treatment liquid (1) and the treatment liquid (2) may also include an oxidant. Examples of this oxidant include nitric acid, nitrous acid, sulfuric acid, sulfurous acid, persulfuric acid, phosphoric acid, carboxylic acid group-containing compounds, sulfonic acid group-containing compounds, hydrochloric acid, bromic acid, chloric acid, hydrogen peroxide, $HMnO_4$, $HVO_3$, $H_2WO_4$, $H_2MoO_4$, and salts of these oxyacids. These oxidants may be used either alone, or in combinations containing a plurality of different oxidants. Of the above oxidants, the use of at least one oxidant selected from the group consisting of nitric acid, nitrous acid, hydrogen peroxide, bromic acid, and salts thereof is preferred. This oxidant ensures uniform formation of a metal oxide film on the surface of the item undergoing treatment, and improves the coatability and corrosion resistance of the item.

Although the mechanism for these effects is not entirely clear, it is thought that by using a predetermined quantity of an oxidant, the etching effect during the chemical conversion treatment occurs more uniformly across the item undergoing treatment such as a steel sheet, and that the zirconium oxide and/or titanium oxide, and the tin oxide are then deposited on the etched portions, enabling formation of an overall more uniform metal oxide film. Furthermore, it is thought that the predetermined quantity of the oxidant facilitates deposition of the tin as metallic tin at the metal interface, and that zirconium oxide and/or titanium oxide are then deposited in the regions containing the deposited metallic tin, which causes an overall increase in the surface coverage of the item undergoing treatment.

In order to achieve the types of effects described above, the quantities of the various oxidants within the treatment liquid (1) or the treatment liquid (2) are as follows. Namely, the quantity of nitric acid is preferably within a range from 100 to 100,000 ppm, even more preferably from 1,000 to 20,000 ppm, and is most preferably from 2,000 to 10,000 ppm. The quantity of nitrous acid or bromic acid is preferably within a range from 5 to 5,000 pm, and even more preferably from 20 to 200 ppm in each case. The quantity of hydrogen peroxide is preferably within a range from 1 to 1,000 ppm, and is even more preferably from 5 to 100 pm. If these quantities are less then the lower limits of the above ranges, then achieving the above effects might become difficult, whereas if the quantities exceed the upper limits, the deposition of zirconium and/or titanium might be inhibited.

At least one of the treatment liquid (1) and the treatment liquid (2) preferably comprises fluoride ions. Fluoride ions perform a role as an etchant of metal materials, and also have a role as a complexing agent for zirconium and/or titanium.

The concentration of fluoride ions varies depending on the pH, and the quantity of free (free-state) fluoride ions is specified for a specific pH. For example, in terms of factors such as ensuring satisfactory etching, favorable stability of the treatment liquid, and a satisfactory film deposition quantity, the quantity of free fluoride ions (the free elemental fluorine content) when the pH of the treatment liquid is 3.0 is preferably within a range from 0.1 to 50 ppm, and is even more preferably from 0.5 to 10 ppm. This free elemental fluorine content can be determined by conducting a measurement using a meter having a fluoride ion electrode.

Examples of compounds that can be used favorably for supplying the fluoride ions include fluorides such as hydrofluoric acid, ammonium fluoride, fluoroboric acid, ammonium hydrogen fluoride, sodium fluoride, and sodium hydrogen fluoride. These compounds may be used either alone, or in combinations containing a plurality of different compounds. Complex fluorides can also be used as a supply source, and examples include hexafluorosilicates, specifically silicofluoric acid (hydrofluosilic acid), zinc silicofluoride (zinc hexafluorosilicate), manganese silicofluoride, magnesium silicofluoride, nickel silicofluoride, iron silicofluoride and calcium silicofluoride. Furthermore, complex fluorides may also be used as compounds for supplying zirconium ions.

The treatment liquids (1) and (2) can each be prepared by mixing each of the components described above, and/or compounds that include the above components, with water.

From the viewpoint of the tin deposition properties upon excessive etching, the pH of the treatment liquid (1) is set to 1.0 or greater. Moreover, from the viewpoint of the tin deposition properties upon inadequate etching, the pH of the treatment liquid (1) is preferably not higher than 5.5.

The pH of the treatment liquid (2) is preferably within a range from 1.5 to 6.5, more preferably from 2.0 to 5.5, and even more preferably from 2.5 to 5.0. The pH is preferably 1.5 or greater in terms of the stability of the treatment liquid. If the pH exceeds 6.5, then the etching of the metal substrate might not proceed sufficiently, and as a result, the deposited film quantity might be low, and satisfactory corrosion resistance might be unobtainable. In contrast, if the pH of the treatment liquid (2) is less than 1.5, then the level of etching might become excessive, making satisfactory film formation impossible, and the film deposition quantity and the film thickness might lose uniformity, having an adverse effect on factors such as the external appearance of the coating.

The pH of each of the treatment liquids can be appropriately adjusted using an acidic compound such as nitric acid or sulfuric acid, or a basic compound such as sodium hydroxide, potassium hydroxide or ammonia.

There are no particular restrictions on the metal material subjected to surface treatment using the above treatment liquids (1) and (2), and examples include iron-based metal substrates, aluminum-based metal substrates, zinc-based metal substrates and magnesium-based metal substrates.

Here, the expression "iron-based metal substrates" describes substrates (metal materials) formed from iron and/or an alloy thereof, the expression "aluminum-based metal substrates" describes substrates (metal materials) formed from aluminum and/or an alloy thereof, the expression "zinc-based metal substrate" describes substrates (metal materials) formed from zinc and/or an alloy thereof, and the expression "magnesium-based metal substrates" describes substrates (metal materials) formed from magnesium and/or an alloy thereof.

Examples of iron-based metal substrates include cold-rolled steel sheet, hot-rolled steel sheet, mild steel sheet and high-tensile steel sheet.

Examples of aluminum-based metal substrates include 5000 series aluminum alloy, 6000 series aluminum alloy, and aluminum-plated steel sheets that have undergone aluminum-based electroplating, hot dipping or deposition plating or the like.

Examples of zinc-based metal substrates include zinc or zinc-based alloy plated steel sheet, including zinc-based electroplated, hot dipped or deposition plated steel sheets such as galvanized steel sheet, zinc-nickel plated steel sheet, zinc-titanium plated steel sheet, zinc-magnesium plated steel sheet and zinc-manganese plated steel sheet.

Examples of magnesium-based metal substrates include the Mg—Al-based alloy AM100A, the Mg—Al—Zn-based alloy A291D, and the Mg—Zn-based alloy ZK51A.

The aforementioned high-tensile steel sheet exists in a multitude of grades depending on the strength and the production method, and specific examples include JSC400J, JSC440P, JSC440W, JSC590R, JSC590T, JSC590Y, JSC780T, JSC780Y, JSC980Y and JSC1180Y.

Moreover, metal materials formed from a combination of a plurality of metals such as iron, aluminum and zinc (including joint portions and contact portions between different metals) can also be used as the metal material. In particular, automobile bodies and components for automobiles are constructed using a variety of different metal materials including, for example, iron, zinc and aluminum, and by using the above treatment liquids (1) and (2), a chemical conversion film can be formed on these bodies and components with high throwing power, enabling favorable corrosion resistance to be imparted.

There are no particular restrictions on the shape of the metal material undergoing treatment, and by performing a chemical conversion treatment with the treatment liquid (2) following the surface treatment with the treatment liquid (1), a chemical conversion film can be formed with favorable throwing power even for a metal material of complex shape having a plurality of curves or pockets.

There are no particular restrictions on the method used for conducting the surface treatment of the metal material using the treatment liquids (1) and (2), provided the method enables the treatment liquids to be brought into contact with the metal material. Specific examples include dipping methods, spraying methods, roll coating methods and pour-on treatment methods.

Alternatively, surface treatment with the treatment liquid (1) and chemical conversion treatment with the treatment liquid (2) may be conducted by an electrolytic treatment using the metal material as the cathode. In such a case, a hydrogen reduction reaction occurs at the interface of the metal material functioning as the cathode, causing an increase in pH. As the pH increases, the stability of the compounds containing elemental zirconium and/or titanium at the cathode interface decreases, and the elements are deposited as oxides (or as hydroxides containing water), forming a chemical conversion film.

More specifically, when a chemical conversion treatment of the metal material is performed using the treatment liquid (2), a dissolution reaction occurs for the metal that constitutes the metal material. When this metal dissolution reaction occurs, in the case of a treatment liquid comprising fluorides of zirconium and/or titanium, an oxide of zirconium and/or titanium is generated, either due to the metal ions eluted into the chemical conversion treatment composition attracting the fluorine of the $ZrF_6^{2-}$ and/or $TiF_6^{2-}$ ions, or due to an increase in the interface pH. This oxide of zirconium and/or titanium is deposited on the surface of the metal material.

The temperature of the treatment liquids (1) and (2) during the surface treatment is preferably within a range from 20 to 70° C., and is even more preferably from 30 to 50° C. If the temperature is less than 20° C., then satisfactory film formation might not occur, whereas even if the temperature exceeds 70° C., no particular additional effect would be achieved.

The surface treatment time is preferably within a range from 2 to 1,100 seconds, and is even more preferably from 30 to 120 seconds. With a treatment time less than 2 seconds, achieving a satisfactory deposited film quantity might be difficult, whereas even if the treatment time exceeds 1,100 seconds, achieving any further effect would be unlikely.

The metal material that has been treated with the treatment liquid (1) may be dried before treatment with the treatment liquid (2).

The metal material is preferably cleaned by conducting a degreasing treatment prior to the surface treatment. Moreover, a water washing treatment is preferably conducted following the degreasing treatment. The degreasing treatment and water washing treatment are conducted to remove oil components and contaminants adhered to the surface of the metal material. The degreasing treatment is performed using a degreasing agent such as a phosphorus-free, nitrogen-free degreasing wash liquid, typically by immersing the metal material for a period of several minutes at a temperature of 30 to 55° C. If desired, a preliminary degreasing treatment may be conducted prior to the degreasing treatment. In order to wash away the degreasing agent, the water washing treatment conducted following the degreasing treatment is typically conducted by spraying the metal material, at least once, with a large quantity of wash water.

As described above, in those cases where the treatment liquid (1) comprises an arbitrary surfactant, a favorable film can be formed even if the metal material is not cleaned in advance by conducting a degreasing treatment. In other words, in this case, during the surface treatment (contact) with the treatment liquid (1), degreasing of the metal material is conducted at the same time as the surface treatment.

In order to enhance the corrosion resistance of an iron-based metal material such as a cold-rolled steel sheet, hot-rolled steel sheet, cast iron or sintered material, and also enable the formation of a uniform surface treatment film, and achieve favorable adhesion, the surface treatment film layer formed on the surface of the iron-based metal material preferably comprises calculated metal element concentrations of at least 10 mg/m$^2$ for elemental zirconium and/or titanium, and at least 0.5 mg/m$^2$ for elemental silicon. A surface treatment film layer comprising at least 20 mg/m$^2$ of elemental zirconium and/or titanium and at least 1 mg/m$^2$ of elemental silicon is more preferred, and a surface treatment film comprising 30 mg/m$^2$ or more of elemental zirconium and/or titanium and 1.5 mg/m$^2$ or more of elemental silicon is even more desirable.

In order to enable the formation of a uniform chemical conversion film and achieve favorable adhesion on a zinc-based metal material such as a zinc or zinc alloy plated steel sheet, or an alloyed hot dipped galvanized steel sheet, thereby imparting the metal material with a favorable level of corrosion resistance, the film deposition quantity of the surface treatment film layer formed on the surface of the zinc-based metal material is preferably such that the film comprises at least 10 mg/m$^2$ of elemental zirconium and/or titanium, and at least 0.5 mg/m$^2$ of elemental silicon. A surface treatment film layer comprising at least 20 mg/m$^2$ of elemental zirconium and/or titanium, and at least 1 mg/m$^2$ of elemental silicon is more preferred, and a surface treatment film layer comprising 30 mg/m$^2$ or more of elemental zirconium and/or titanium and 1.5 mg/m$^2$ or more of elemental silicon is even more desirable.

In order to enable the formation of a uniform chemical conversion film and achieve favorable adhesion on an aluminum-based metal material such as an aluminum casting or an aluminum alloy sheet, thereby imparting the metal material with a favorable level of corrosion resistance, the film deposition quantity of the surface treatment film layer formed on the surface of the aluminum-based metal material is preferably such that the film comprises at least 5 mg/m$^2$ of elemental zirconium and/or titanium, and at least 0.5 mg/m$^2$ of elemental silicon. A surface treatment film layer comprising at least 10 mg/m$^2$ of elemental zirconium and/or titanium, and at least 1 mg/m$^2$ of elemental silicon is even more preferred.

Moreover, in order to enable the formation of a uniform chemical conversion film and achieve favorable adhesion on a magnesium-based metal material such as an magnesium alloy sheet or a magnesium casting, thereby imparting the metal material with a favorable level of corrosion resistance, the film deposition quantity of the surface treatment film layer formed on the surface of the magnesium-based metal material is preferably such that the film comprises at least 5 mg/m$^2$ of elemental zirconium and/or titanium, and at least 0.5 mg/m$^2$ of elemental silicon. A surface treatment film layer comprising at least 10 mg/m$^2$ of elemental zirconium and/or titanium, and at least 1 mg/m$^2$ of elemental silicon is even more preferred.

For any of the metal materials, although there is no particular upper limit for the film deposition quantity for the surface treatment film layer, if the film deposition quantity is overly large, then cracks may be more likely to occur within the surface treatment film layer, and obtaining a favorable film may become more difficult. For these reasons, the film deposition quantity for the surface treatment film preferably includes a calculated metal element concentration of zirconium and/or titanium that is not more than 1 g/m$^2$, and even more preferably 800 mg/m$^2$ or less.

Furthermore, for any of the metal materials, the mass ratio of elemental zirconium and/or titanium relative to elemental silicon within the surface treatment film is preferably within a range from 0.5 to 50, in terms of ensuring desired corrosion resistance and adhesion and forming a uniform film with no cracks.

Moreover, the elemental ratio between zirconium and/or titanium and tin within the obtained chemical conversion film is preferably within a range from 1/10 to 10/1.

Furthermore, in those cases where the chemical conversion film is formed using a treatment liquid that comprises copper ions, the quantity of copper within the film is preferably at least 0.5 mg/m$^2$ in order to achieve the targeted effects.

Following surface coating, the metal material may be brought into contact with an acidic aqueous solution comprising at least one metal selected from the group consisting of cobalt, nickel, tin, copper, titanium and zirconium. By including this acid contact step, the corrosion resistance of the chemical conversion film can be further enhanced.

There are no particular restrictions on the supply source for the one or more metal elements selected from the group consisting of cobalt, nickel, tin, copper, titanium and zirconium, but readily available compounds such as oxides, hydroxides, chlorides, nitrates, oxynitrates, sulfates, oxysulfates, carbonates, oxycarbonates, phosphates, oxyphosphates, oxalates, oxyoxalates and organometallic compounds containing the above metal elements can be used favorably.

The pH of the acidic aqueous solution containing the above metal elements is preferably within a range from 2 to 6. The pH of the acidic aqueous solution can be adjusted by using an acid such as phosphoric acid, nitric acid, sulfuric acid, hydrofluoric acid, hydrochloric acid or an organic acid, or an alkali such as sodium hydroxide, potassium hydroxide, lithium hydroxide, an alkali metal salt, ammonia, an ammonium salt or an amine.

Alternatively, the surface-treated metal material may be brought into contact with a polymer-containing liquid comprising at least one of a water-soluble polymer compound and a water-dispersible polymer compound. By including this polymer-containing liquid contact step, the corrosion resistance of the chemical conversion film can be further enhanced.

There are no particular restrictions on the water-soluble polymer compound and/or water-dispersible polymer compound, and examples include polyvinyl alcohols, poly(meth)acrylic acids, copolymers of acrylic acid and methacrylic acid, copolymers of ethylene and an acrylic monomer such as (meth)acrylic acid or a (meth)acrylate, copolymers of ethylene and vinyl acetate, polyurethanes, amino-modified phenolic resins, polyester resins, epoxy resins, tannins, tannic acid and salts thereof, and phytic acid.

A surface-coated material that has undergone chemical conversion treatment in the manner described above may subsequently be painted to enable the production of a coated metal item.

Preferably a coating film is formed by electrodeposition coating. Other examples of the coating film include coating films formed using conventional coating materials such as solvent-based coating materials, water-based coating materials and powdered coating materials.

Accordingly, a method of producing a coated metal item according to the present invention comprises forming a coating film by cationic electrodeposition coating on the surface-treated metal material produced in accordance with the method of producing a surface-treated metal material described above.

Cationic electrodeposition coating is conducted by setting the metal material that represents the coating target as the cathode and then applying a voltage. Upon application of a voltage, the coating film-forming component (the cationic component) within the electrodeposition coating material migrates to the surface of the metal material by electrophoresis, and is deposited as a coating film. Because the deposited coating film has insulating properties, the electrical resistance of the coating film increases as the deposition of the coating film progresses, which suppresses further deposition of the coating film at locations where coating film deposition has already occurred, and encourages deposition of the coating film to start within regions where a coating film has not yet been deposited. In this manner, formation of the coating film occurs across the entire metal material.

Prior to conducting the cationic electrodeposition coating, the metal material with the chemical conversion film formed thereon is preferably washed with water, thereby washing off any of the treatment liquid (2) adhered to the surface of the metal material.

This water washing following the chemical conversion treatment may be repeated a plurality of times, and in such cases, the final water wash is preferably conducted with pure water. This water washing treatment following the chemical conversion treatment may be conducted by spray washing or immersion washing, or may also be conducted using a combination of these methods.

Following completion of the water washing treatment conducted after the chemical conversion treatment, drying may be conducted using a conventional method if required, but with the production method of the present invention, the coating can be conducted immediately following the water washing treatment, without conducting a drying treatment. In other words, a wet-on-wet coating method may be employed. Accordingly, the surface treatment process for a metal material prior to electrodeposition coating, and in particular the surface treatment process prior to electrodeposition coating for an outer panel or any of a variety of other components for a vehicle such as an automobile body or a motorcycle body, can be shortened.

There are no particular restrictions on the cationic electrodeposition coating material, and typical well known materials may be used. Specifically, coating materials comprising a resin that acts as the coating film-forming component, and a curing agent that cures the electrodeposited resin, and where necessary also comprising arbitrary pigments, solvents and/or additives, may be used.

There are no particular restrictions on the resin, provided it has a positive charge, and migrates to, and is deposited at, the coating target that acts as the cathode. Of the possible resins, the use of a modified epoxy resin is preferred.

A modified epoxy resin refers to a resin prepared by adding an amine or a sulfide or the like to the epoxy groups of an epoxy resin, and then cationizing the resin by performing a neutralization with an acid such as acetic acid. An epoxy resin refers to a resin having at least one epoxy group within each molecule. Specific examples of the modified epoxy resin include aminated epoxy resins and sulfonium-modified epoxy resins.

A blocked isocyanate is preferably used as the curing agent for the modified epoxy resin.

Moreover, a rustproof pigment is preferably used as the pigment, and for example, may be added as a pigment-dispersed paste comprising the pigment dispersed within an arbitrary resin.

The electrodeposition coating can be conducted, for example, by applying a voltage of 50 to 450 V over a predetermined period of time. The voltage application time varies depending on the electrodeposition conditions, but is typically within a range from 2 to 4 minutes.

Following completion of the cationic electrodeposition coating step, a cured coating film can be obtained by baking the metal material at a predetermined temperature, either immediately following the coating step or after subsequent washing with water. The baking conditions vary depending on the type of cationic electrodeposition coating material used, but are typically within a range from 120 to 260° C., and preferably from 140 to 220° C. The baking time can typically be set within a range from 10 to 30 minutes.

EXAMPLES

A more detailed description of the present invention is presented below based on a series of examples and comparative examples, although the present invention is in no way limited solely to these examples. Unless stated otherwise, "parts" refers to "parts by mass", and "%" refers to "% by mass".

<Metal Materials>

Commercially available cold-rolled steel sheets (SPC, manufactured by Nippon Testpanel Co., Ltd., 70 mm×150 mm×0.8 mm) and galvanized steel sheets (GA, manufactured by Nippon Testpanel Co., Ltd., 70 mm×150 mm×0.8 mm) were used as metal materials. The galvanized steel sheets were used for evaluating the coating voltage difference described below, whereas the other evaluations were conducted using the cold-rolled steel sheets.

As a pretreatment, a degreasing treatment of the metal material was performed for 2 minutes at 40° C. using an alkali degreasing treatment agent SURFCLEANER EC92 (manufactured by Nippon Paint Co., Ltd.).

Following the degreasing treatment, the metal material was washed by immersion within a water washing tank, and was then spray washed with tap water for approximately 30 seconds.

<Surface Treatment Using Treatment Liquid (1)>

Treatment liquids (1) were prepared with the compositions shown in Tables. In other words, each of the tin compounds that functioned as a tin ion supply source was dissolved in deionized water so as to achieve a predetermined tin concentration, and nitric acid and sodium hydroxide were then used to adjust the pH to a predetermined value.

Each of the obtained treatment liquids (1) was heated to 40° C., and a metal substrate that had undergone the degreasing treatment described above was dipped in the treatment liquid for 90 seconds, thereby conducting a surface treatment with the treatment liquid (1).

In Examples 10 and 23, metal materials that had not undergone pretreatment using the above alkali degreasing treatment agent were used, and a surface treatment was conducted by dipping these metal materials in a treatment liquid (1) containing an added surfactant NOIGEN XL-40 (polyoxyalkylene decyl ether, manufactured by Dai-ichi Kogyo Seiyaku Co., Ltd.).

In Tables, ferric sulfate and sodium nitrate are rustproofing agents, and sodium gluconate and methanesulfonic acid are chelating agents. Furthermore, the concentration of the ferric sulfate is shown as a ferric ion ($Fe^{3+}$) concentration.

<Chemical Conversion Treatment Using Treatment Liquid (2)>

In Production Example 1, a 40% aqueous solution of fluorozirconic acid was used as a zirconium ion supply source, and was diluted with deionized water to yield a Zr ion concentration of 500 ppm. To this solution was added sufficient γ-aminopropyltriethoxysilane (APS) to generate a concentration of 200 ppm, and nitric acid and sodium hydroxide were then used to adjust the pH to 15, thus completing production of a treatment liquid (2) I.

In Production Example 2, a 40% aqueous solution of fluorozirconic acid was used as a zirconium ion supply source, and was diluted with deionized water to yield a Zr ion concentration of 500 ppm. To this solution was added sufficient γ-aminopropyltriethoxysilane (APS) to generate a concentration of 200 ppm and sufficient tin sulfate to generate a concentration of 30 ppm, and nitric acid and sodium hydroxide were then used to adjust the pH to 3.5, thus completing production of a treatment liquid (2) II.

In Production Example 3, a 40% aqueous solution of fluorozirconic acid was used as a zirconium ion supply source, and was diluted with deionized water to yield a Zr ion concentration of 500 ppm. To this solution was added sufficient polyallylamine (PAA-10C manufactured by Nitto Boseki Co., Ltd.) to generate a concentration of 100 ppm, and nitric acid and sodium hydroxide were then used to adjust the pH to 3.5, thus completing production of a treatment liquid (2) III.

In Production Example 4, a 40% aqueous solution of fluorozirconic acid was used as a zirconium ion supply source mixed with aluminum nitrate as an aluminium ion supply source, and were diluted with deionized water to yield a Zr ion concentration of 500 ppm and an Al ion concentration of 100 ppm. To this solution were added nitric acid and sodium hydroxide to adjust the pH to 3.5, thus completing production of a treatment liquid (2) IV.

In Production Example 5, a 40% aqueous solution of fluorozirconic acid was used as a zirconium ion supply source and magnesium nitrate was used as a magnesium ion supply, and were diluted with deionized water to yield a Zr ion concentration of 500 ppm and a Mg ion concentration of 500 ppm. To this solution was added sufficient polyallylamine (PAA-10C manufactured by Nitto Boseki Co., Ltd.) to generate a concentration of 100 ppm, and nitric acid and sodium hydroxide were then used to adjust the pH to 3.5, thus completing production of a treatment liquid (2) V.

The metal substrates that had undergone treatment using the above treatment liquid (1) were washed with water, the treatment liquid (2) was heated to 40° C., and the metal substrates were then dipped in the treatment liquid (2) for 90 seconds, thereby conducting a chemical conversion treatment with the treatment liquid (2).

<Measurement of Elemental Sn Quantity within Film>

The quantity ($mg/m^2$) of elemental Sn incorporated within the film formed by the treatment liquid (1) was measured using a X-ray fluorescence spectrometer XRF1700, manufactured by Shimadzu Corporation.

Following treatment with the treatment liquids (1) and (2) in the manner described above, the metal materials were washed with tap water and ion-exchanged water, and the metal materials (hereafter referred to as "test sheets") were then subjected to the tests described below to evaluate various performance factors.

<Primary Rustproofing Performance>

The test sheet was immersed in pure water at 25° C. for 5 hours, and the state of rust occurrence was inspected visually and evaluated against the following criteria.

A: absolutely no rust occurrence detected
B: extremely minimal rust occurrence detected
C: obvious rust occurrence <Throwing Power>

Figure 1:
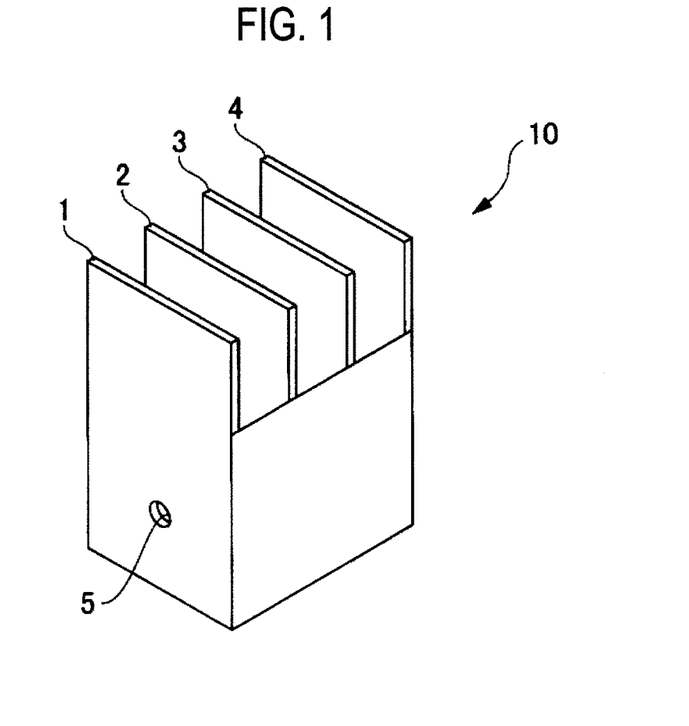
FIG. 1 is a perspective view showing an example of a box used in evaluating throwing power.

The throwing power was evaluated using a "4-sheet box method". In other words, as shown in FIG. 1, test sheets 1 to 4 were positioned in an upright state, in a parallel arrangement with a spacing of 20 mm between sheets, and a box 10 was prepared by closing in the lower portions along both sides of the sheets and the bottom surface with an insulator such as a cloth adhesive tape. Through holes 5 having a diameter of 8 mm were provided in the lower portion of the metal materials 1, 2 and 3, but not in the metal material 4.

Figure 2:
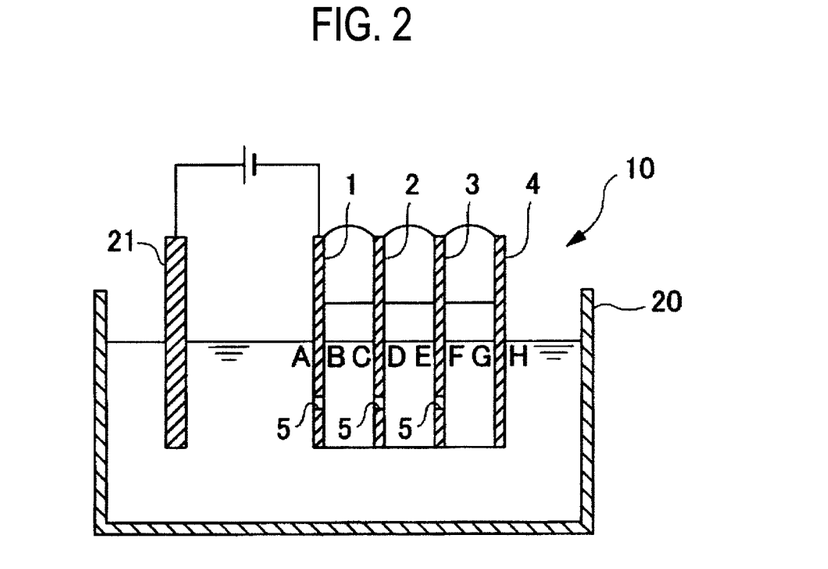
FIG. 2 is a cross-sectional side view that schematically illustrates the evaluation of throwing power.

This box 10 was immersed in an electrodeposition coating vessel 20 filled with a cationic electrodeposition coating material POWERNIX 110 (a product name, manufactured by Nippon Paint Co., Ltd.). At this time, the cationic electrodeposition coating material enters the interior of the box 10 only through each of the through holes 5.

With the cationic electrodeposition coating material undergoing stirring with a magnetic stirrer, each of the test sheets 1 to 4 was connected electrically, and a counter electrode 21 was positioned at a distance of 150 mm from the test sheet 1. Cationic electrodeposition coating was conducted by applying a voltage, with each test sheet 1 to 4 acting as a cathode and the counter electrode 21 acting as the anode. The coating was conducted by raising the voltage to a target voltage (210 V or 160 V) over a period of 30 seconds from the start of voltage application, and then maintaining the target voltage for 150 seconds. The bath temperature was controlled at 30° C.

Following coating, each of the test sheets 1 to 4 was washed with water, baked at 170° C. for 25 minutes and then air-cooled. The film thickness of the coating film formed on surface A of the test sheet 1 closest to the counter electrode 21, and the film thickness of the coating film formed on surface G of the test sheet 4 farthest from the counter electrode 21 were measured, and the throwing power was evaluated by determining the ratio of film thickness (surface G)/film thickness (surface A). Larger values for this ratio can be evaluated as indicating more favorable throwing power. The pass level was set to 40% or greater.

<Coating Voltage Difference>

The voltage required to form an electrodeposition coating film of 20 μm on a test sheet using the aforementioned cationic electrodeposition coating material POWERNIX 110 was determined. The difference in the coating voltage required to form the 20 μm electrodeposition coating film between the case where the metal substrate was a galvanized steel sheet and the case where the metal substrate was a cold-rolled steel sheet was determined. Smaller values for this difference indicate superior performance as a chemical conversion treatment film. A difference of 40 V or less was deemed a pass.

The voltage required to form an electrodeposition coating film of 20 μM was determined in the following manner. Namely, the electrodeposition conditions employed involved raising the voltage to a predetermined voltage over a period of 30 seconds, subsequently maintaining that voltage for 150 seconds, and then measuring the resulting film thickness. This process was conducted for voltages of 150 V, 200 V and 250 V, and the resulting relational formula between the voltage and the film thickness was used to determine the voltage required to obtain a film thickness of 20 μm.

<External Appearance of Coating>

Cationic electrodeposition coating was performed on a test sheet using the aforementioned POWERNIX 110, and the external appearance of the resulting electrodeposition coating film was evaluated against the following criteria.

AA: a uniform coating film was obtained
A: a substantially uniform coating film was obtained
B: the coating film included some irregularities
C: the coating film contained noticeable irregularities <Secondary Adhesion Test (SDT)>

A 20 μm electrodeposition coating film was formed on a test sheet in the same manner as that described above, two parallel lengthwise cuts that penetrated down to the metal substrate were inserted in the coating film, and the test sheet was then immersed in a 5% aqueous solution of sodium chloride at 55° C. for 240 hours. Subsequently, following washing with water and air drying, an adhesive tape LP-24 (a product name, manufactured by Nichiban Co., Ltd.) was bonded to the cut portions, and the adhesive tape was then peeled rapidly away from the test sheet. The maximum width of coating material adhered to the peeled adhesive tape (the width from the cut portion) was measured.

AA: 0 mm
A: less than 2 mm
B: from 2 mm to less than 5 mm
C: 5 mm or greater

<Cycle Corrosion Test (CCT)>

Following formation of a 20 μm electrodeposition coating film on a test sheet in the same manner as that described above, the edges and rear surface of the test sheet were sealed with tape, and cross cuts that penetrated through to the metal substrate were inserted in the coating film. The test sheet was then sprayed continuously for 2 hours with a 5% aqueous solution of sodium chloride held at 35° C. inside a salt water spray tester held at a temperature of 35° C. and a humidity of 95%. Subsequently, the test sheet was dried for 4 hours under conditions including a temperature of 60° C. and a humidity of 20 to 30%. This process was conducted 3 times within 24 hours to complete a single cycle, and after 200 cycles, the width of swelling (the width of the swollen portion centered on the cut) was measured.

AA: less than 6 mm
A: from 6 mm to less than 8 mm
B: from 8 mm to less than 10 mm
C: 10 mm or greater <Salt Water Spray Test (SST)>

Following formation of a 20 μm electrodeposition coating film on a test sheet in the same manner as that described above, the edges and rear surface of the test sheet were sealed with tape, and cross cuts that penetrated through to the metal substrate were inserted in the coating film. The test sheet was then sprayed continuously for 840 hours with a 5% aqueous solution of sodium chloride held at 35° C. inside a salt water spray tester held at a temperature of 35° C. and a humidity of 95%. Following subsequent washing with water and air drying, an adhesive tape LP-24 (a product name, manufactured by Nichiban Co., Ltd.) was bonded to the cut portions, and the adhesive tape was then peeled rapidly away from the test sheet. The maximum width of coating material adhered to the peeled adhesive tape (the width from the cut portion) was measured.

A: less than 2 mm
B: from 2 mm to less than 5 mm
C: 5 mm or greater

The results of the above evaluations are shown in Table 1.

This Application is based upon and claims the benefit of priority from prior Japanese Patent Application No. 2007-251509 filed on Sep. 27, 2007; the entire contents of which are incorporated by reference herein.

It is to be noted that, besides those already mentioned above, many modifications and variations of the above embodiments may be made without departing from the novel and advantageous features of the present invention. Accordingly, all such modifications and variations are intended to be included within the scope of the appended claims.

TABLE 1

| | Treatment liquid (1) | | | | | Film Sn |
| --- | --- | --- | --- | --- | --- | --- |
| | Tin ion compound | Sn concentration (ppm) | pH | Added component (value in brackets is concentration (ppm)) | Treatment liquid (2) | quantity (mg/m²) |
| Example 1 | Tin sulfate | 100 | 3.5 | | I | 12 |
| Example 2 | Tin sulfate | 100 | 2 | | I | 14 |
| Example 3 | Tin sulfate | 100 | 1 | | I | 10 |
| Example 4 | Tin sulfate | 100 | 5 | | I | 8 |
| Example 5 | Na stannate | 1000 | 11 | | I | 4 |
| Example 6 | Tin sulfate | 10 | 3.5 | | I | 8 |
| Example 7 | Tin sulfate | 1000 | 3.5 | | I | 15 |
| Example 8 | Tin fluoride | 100 | 3.5 | | I | 13 |
| Example 9 | Tin acetate | 100 | 3.5 | | I | 12 |
| Example 10 | Tin sulfate | 100 | 3.5 | Surfactant (1,000) | I | 12 |
| Example 11 | Tin sulfate | 100 | 3.5 | Ferric sulfate $Fe^{3+}$ (200) | I | 15 |
| Example 12 | Tin sulfate | 100 | 3.5 | Sodium nitrate (10,000) | I | 14 |
| Example 13 | Tin sulfate | 100 | 3.5 | Sodium gluconate (100) | I | 11 |
| Example 14 | Tin sulfate | 100 | 3.5 | Methanesulfonic acid (100) | I | 16 |
| Example 15 | Tin sulfate | 100 | 3.5 | | II | 12 |
| Example 16 | Tin sulfate | 100 | 2 | | II | 14 |
| Example 17 | Tin sulfate | 100 | 1 | | II | 10 |
| Example 18 | Tin sulfate | 100 | 5 | | II | 8 |
| Example 19 | Tin sulfate | 10 | 3.5 | | II | 8 |
| Example 20 | Tin sulfate | 1000 | 3.5 | | II | 15 |
| Example 21 | Tin fluoride | 100 | 3.5 | | II | 13 |
| Example 22 | Tin acetate | 100 | 3.5 | | II | 12 |

TABLE 1-continued

| | Tin ion compound | Sn concentration (ppm) | pH | Added component (value in brackets is concentration (ppm)) | Treatment liquid (2) | Film Sn quantity (mg/m²) |
|---|---|---|---|---|---|---|
| Example 23 | Tin sulfate | 100 | 3.5 | Surfactant (1,000) | II | 12 |
| Example 24 | Tin sulfate | 100 | 3.5 | Ferric sulfate $Fe^{3+}$ (200) | II | 15 |
| Example 25 | Tin sulfate | 100 | 3.5 | Sodium nitrate (10,000) | II | 14 |
| Example 26 | Tin sulfate | 100 | 3.5 | Sodium gluconate (100) | II | 11 |
| Example 27 | Tin sulfate | 100 | 3.5 | Methanesulfonic acid (100) | II | 16 |

| | Evaluation Results | | | | | | | |
|---|---|---|---|---|---|---|---|---|
| | Primary rustproofing | Throwing power 210 V | 160 V | Coating voltage difference (V) | Coating external appearance | SDT | CCT | SST |
| Example 1 | A | 55% | | 30 V | A | A | A | A |
| Example 2 | A | 52% | | 30 V | A | AA | AA | A |
| Example 3 | A | 55% | | 40 V | A | AA | AA | A |
| Example 4 | A | 50% | | 30 V | A | A | A | A |
| Example 5 | A | 42% | | 50 V | A | A | A | A |
| Example 6 | A | 50% | | 40 V | A | A | A | A |
| Example 7 | A | 57% | | 20 V | A | A | A | A |
| Example 8 | A | 52% | | 30 V | A | A | A | A |
| Example 9 | A | 51% | | 30 V | A | A | A | A |
| Example 10 | A | 50% | | 30 V | A | A | A | A |
| Example 11 | A | 53% | | 30 V | A | A | A | A |
| Example 12 | A | 55% | | 30 V | A | AA | A | A |
| Example 13 | A | 55% | | 30 V | A | A | A | A |
| Example 14 | A | 59% | | 30 V | A | AA | A | A |
| Example 15 | A | 66% | 59% | 20 V | AA | A | AA | A |
| Example 16 | A | 67% | 55% | 20 V | AA | A | AA | A |
| Example 17 | A | 62% | 52% | 20 V | AA | A | AA | A |
| Example 18 | A | 63% | 48% | 20 V | AA | A | A | A |
| Example 19 | A | 58% | 46% | 20 V | AA | A | AA | A |
| Example 20 | A | 62% | 59% | 10 V | AA | A | AA | A |
| Example 21 | A | 66% | 55% | 10 V | AA | A | AA | A |
| Example 22 | A | 69% | 57% | 20 V | AA | A | AA | A |
| Example 23 | A | 60% | 55% | 20 V | AA | A | AA | A |
| Example 24 | A | 62% | 53% | 20 V | AA | A | AA | A |
| Example 25 | A | 66% | 50% | 10 V | AA | A | AA | A |
| Example 26 | A | 64% | 53% | 20 V | AA | A | AA | A |
| Example 27 | A | 69% | 60% | 10 V | AA | A | AA | A |

TABLE 2

| | Treatment liquid (1) | | | | | | Evaluation Results |
|---|---|---|---|---|---|---|---|
| | Tin ion compound | Sn concentration (ppm) | pH | Added component (value in brackets is concentration (ppm)) | Treatment liquid (2) | Film Sn quantity (mg/m²) | Primary rustproofing |
| Example 28 | Tin sulfate | 100 | 3.5 | | III | 12 | A |
| Example 29 | Tin sulfate | 100 | 2 | | III | 14 | A |
| Example 30 | Tin sulfate | 100 | 1 | | III | 10 | A |
| Example 31 | Tin sulfate | 100 | 5 | | III | 8 | A |
| Example 32 | Tin sulfate | 100 | 3.5 | | IV | 12 | A |
| Example 33 | Tin sulfate | 100 | 3.5 | | V | 12 | A |
| Comp. Example 1 | None | | | | I | 0 | B |
| Comp. Example 2 | None | | | | II | 0 | B |
| Comp. Example 3 | None | | | | II | 0 | B |
| Comp. Example 4 | Tin sulfate | 100 | 0.5 | | I | 5 | B |
| Comp. Example 5 | Tin sulfate | 3 | 3.5 | | I | 3 | B |

| | Evaluation Results | | | | | | | |
|---|---|---|---|---|---|---|---|---|
| | Throwing power 210 V | 160 V | Coating voltage difference (V) | Coating external appearance | SDT | CCT | SST | |
| Example 28 | 53% | | 30 V | A | A | A | A | |
| Example 29 | 50% | | 30 V | A | A | A | A | |
| Example 30 | 55% | | 40 V | A | A | A | A | |
| Example 31 | 53% | | 30 V | A | A | A | A | |
| Example 32 | 53% | | 30 V | A | B | A | A | |
| Example 33 | 53% | | 30 V | A | A | A | A | |
| Comp. Example 1 | 21% | 12% | 80 V | B | A | B | A | |
| Comp. Example 2 | 35% | 25% | 50 V | A | AA | AA | A | |

TABLE 2-continued

| | | | | | | | |
|---|---|---|---|---|---|---|---|
| Comp. Example 3 | 20% | 12% | 80 V | B | A | B | A |
| Comp. Example 4 | 24% | 16% | 80 V | B | A | B | A |
| Comp. Example 5 | 25% | 14% | 80 V | B | A | B | A |

The invention claimed is:

1. A method of producing a surface-treated metal material, comprising:

surface treating a metal material using a treatment liquid (1), which comprises from 10 to 10,000 ppm of tin ions and has a pH of 1.0 or greater, to form a first layer; and subjecting the metal material that has undergone surface treatment with the treatment liquid (1) to an additional chemical conversion treatment using a treatment liquid (2), which comprises tin ions and further comprises zirconium ions and/or titanium ions, wherein the chemical conversion treatment using treatment liquid (2) forms a uniform metal oxide film.

2. The method of producing a surface-treated metal material according to claim 1, wherein the pH of the treatment liquid (1) is within a range from 1.0 to 5.5.

3. The method of producing a surface-treated metal material according to claim 1, wherein the treatment liquid (1) further comprises at least one of a surfactant and a rustproofing agent.

4. The method of producing a surface-treated metal material according to claim 1, wherein the treatment liquid (2) further comprises a polyamine compound.

5. The method of producing a surface-treated metal material according to claim 4, wherein the polyamine compound incorporated within the treatment liquid (2) is an organosiloxane obtained by subjecting an amino group-containing silane to a polycondensation.

6. The method according to claim 1, wherein the additional chemical conversion treatment comprises electrolytic treatment using the metal material as a cathode.

7. The method according to claim 1, wherein the treatment liquid (2) further comprises aluminum ions and/or indium ions.

8. The method according to claim 1, wherein the elemental ratio between zirconium and/or titanium and tin within the obtained metal oxide film is within a range from 1/10 to 10/1.

9. A method of producing a coated metal item, comprising:

surface treating a metal material using a treatment liquid (1), which comprises from 10 to 10,000 ppm of tin ions and has a pH of 1.0 or greater, to form a first layer;

subjecting the metal material that has undergone surface treatment with the treatment liquid (1) to an additional chemical conversion treatment using a treatment liquid (2), which comprises tin ions and further comprises zirconium ions and/or titanium ions, to form a metal oxide film of uniform thickness; and forming on the metal material that has undergone chemical conversion treatment with the treatment liquid (2) a coating film by cationic electrodeposition coating.

10. The method of producing a coated metal item according to claim 9, wherein the treatment liquid (2) further comprises a polyamine compound.

11. A method of producing a surface-treated metal material, comprising:

surface treating a metal material using a treatment liquid (1), which comprises from 10 to 10,000 ppm of tin ions and has a pH of 1.0 or greater; and subjecting the metal material that has undergone surface treatment with the treatment liquid (1) to an additional chemical conversion treatment using a treatment liquid (2), which comprises tin ions and further comprises from 10 to 10,000 ppm of zirconium ions and/or titanium ions to form a uniform metal oxide layer, and wherein a ratio of the tin ion concentration within the treatment liquid (1) relative to the concentration of the zirconium and/or titanium ions within the treatment liquid (2) is within a range of from 0.005 to 1.

12. A method of producing a coated metal item, comprising:

surface treating a metal material using a treatment liquid (1), which comprises from 10 to 10,000 ppm of tin ions and has a pH of 1.0 or greater;

subjecting the metal material that has undergone surface treatment with the treatment liquid (1) to an electrolytic treatment using:

a treatment liquid (2), which comprises tin ions and further comprises zirconium ions and/or titanium ions, and the metal material as a cathode; and forming on the metal material that has undergone chemical conversion treatment with the treatment liquid (2) a coating film by cationic electrodeposition coating.

* * * * *